US011127969B2

(12) United States Patent
Satake (10) Patent No.: US 11,127,969 B2
(45) Date of Patent: Sep. 21, 2021

(54) FUEL CELL SYSTEM (71) Applicant: NISSAN MOTOR CO., LTD., Yokohama (JP)

(72) Inventor: Masamitsu Satake, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 42 days.

(21) Appl. No.: 16/333,422

(22) PCT Filed: Sep. 15, 2016

(86) PCT No.: PCT/JP2016/077298
§ 371 (c)(1),
(2) Date: Mar. 14, 2019

(87) PCT Pub. No.: WO2018/051468
PCT Pub. Date: Mar. 22, 2018

(65) Prior Publication Data
US 2019/0252713 A1    Aug. 15, 2019

(51) Int. Cl.
H01M 8/2425    (2016.01)
H01M 8/04082   (2016.01)
H01M 8/04186   (2016.01)
H01M 8/2457    (2016.01)
H01M 8/0267    (2016.01)
(Continued)

(52) U.S. Cl.
CPC ....... H01M 8/2425 (2013.01); H01M 8/0267 (2013.01); H01M 8/04186 (2013.01); H01M 8/04201 (2013.01); H01M 8/04231 (2013.01); H01M 8/2457 (2016.02); H01M 8/04022 (2013.01); H01M 8/0618 (2013.01); H01M 2008/1293 (2013.01); H01M 2250/20 (2013.01)

(58) Field of Classification Search
CPC .......... H01M 8/2425; H01M 8/04186; H01M 8/04201; H01M 8/04231; H01M 8/0267; H01M 8/2457; H01M 8/0618; H01M 8/04022; H01M 2250/20; H01M 2008/1293; Y02E 60/50; Y02T 90/40
See application file for complete search history.

(56) References Cited

U.S. PATENT DOCUMENTS 6,974,645 B2    12/2005   Itou et al.
2002/0090538 A1   7/2002   Schaefer et al.
(Continued)

FOREIGN PATENT DOCUMENTS

JP    2000-192863 A    7/2000
JP    2003-187835 A    7/2003
(Continued)

Primary Examiner — Philip A. Stuckey
(74) Attorney, Agent, or Firm — Foley & Lardner LLP (57) ABSTRACT A fuel cell system includes a collector configured to collect vaporized fuel that is vaporized in a fuel tank; an introduction path that is connected to the fuel tank and the collector, the introduction path being configured to guide the vaporized fuel to the collector; a discharge path configured to discharge the vaporized fuel collected by the collector to a supply/discharge mechanism; and a supply path and a purge gas supply unit that are connected to the collector, the supply path and the purge gas supply unit being configured to supply, to the collector, purge gas for pushing out the vaporized fuel collected by the collector into the discharge path.

13 Claims, 7 Drawing Sheets (51) Int. Cl.
*H01M 8/04223* (2016.01)
*H01M 8/124* (2016.01)
*H01M 8/04014* (2016.01)
*H01M 8/0612* (2016.01)

(56) References Cited

U.S. PATENT DOCUMENTS

| | | |
|---|---|---|
| 2002/0124836 A1 | 9/2002 | Reddy |
| 2003/0064259 A1 | 4/2003 | Gittleman |
| 2004/0048122 A1 | 3/2004 | Itou et al. |
| 2004/0053088 A1* | 3/2004 | Haga ............... H01M 8/04097 429/412 |
| 2008/0118800 A1 | 5/2008 | Devriendt et al. |
| 2011/0281185 A1* | 11/2011 | Sridhar ............... H01M 8/2475 429/408 |
| 2015/0353201 A1* | 12/2015 | Hagh ..................... A62C 3/08 244/135 R |
| 2016/0172698 A1* | 6/2016 | Ogawa .................... B01J 8/065 429/413 |
| 2017/0237093 A1 | 8/2017 | Dewald et al. |
| 2017/0326527 A1 | 11/2017 | Kume et al. |
| 2018/0138526 A1 | 5/2018 | Uozumi |

FOREIGN PATENT DOCUMENTS

| | | |
|---|---|---|
| JP | 2009-277621 A | 11/2009 |
| JP | 2010-508633 A | 3/2010 |
| WO | WO 2016/028630 A1 | 2/2016 |
| WO | WO 2016/140266 A1 | 9/2016 |
| WO | WO 2016/174738 A1 | 11/2016 |
| WO | WO 2016/174739 A1 | 11/2016 |

* cited by examiner

FUEL CELL SYSTEM

TECHNICAL FIELD

The present invention relates to a fuel cell system.

BACKGROUND ART

A solid oxide fuel cell (SOFC) is expected as a fuel cell to be mounted on a vehicle from the viewpoint of high efficiency, long-time stability, and the like. Particularly, liquid fuel can be used as the fuel of the fuel cell and thus the fuel can be safely managed compared to the case where fuel gas is stored in a tank. Although a part of liquid fuel may vaporize inside a fuel tank storing the liquid fuel because the liquid fuel has volatility, it is not preferable to discharge this vaporized component to the atmospheric air from the viewpoint of air pollution.

To solve such a problem, Japanese Patent Application Laid-Open No. 2000-192863 discloses a technology for adsorbing vaporized fuel that is vaporized in a fuel tank to a canister, sucking the canister by using a pump to introduce gas for purge into the canister, detaching the adsorbed fuel to supply the detached fuel and the gas for purge (purge gas) to a reformer, and reforming them along with fuel for combustion in the reformer.

SUMMARY OF INVENTION

However, in the above technology, the pump directly touch fuel and thus the pump may be deteriorated by contact with vaporized fuel.

An object of the invention is to provide a fuel cell system that can suppress the deterioration of a supply section of purge gas for detaching vaporized fuel adsorbed to a canister.

According to an aspect of this invention, there is provided a fuel cell system comprising: a fuel cell that is supplied with a fuel gas and an oxidant gas to generate electric power; a fuel tank that stores therein liquid fuel acting as the fuel gas; an oxidant gas supply source configured to supply the oxidant gas; a supply/discharge mechanism that is connected to the fuel tank and the oxidant gas supply source, the supply/discharge mechanism being configured to supply and discharge the fuel gas and the oxidant gas to and from the fuel cell; a collector configured to collect vaporized fuel that is vaporized in the fuel tank; an introduction path that is connected to the fuel tank and the collector, the introduction path being configured to guide the vaporized fuel to the collector; a discharge path configured to discharge the vaporized fuel collected by the collector to the supply/discharge mechanism; and a supply path and a purge gas supply unit that are connected to the collector, the supply path and the purge gas supply unit being configured to supply, to the collector, purge gas for pushing out the vaporized fuel collected by the collector into the discharge path.

DESCRIPTION OF EMBODIMENTS

Hereinafter, exemplary embodiments of the present invention will be explained with reference to the accompanying drawings.

First Embodiment

Configuration of Fuel Cell System

Figure 1:
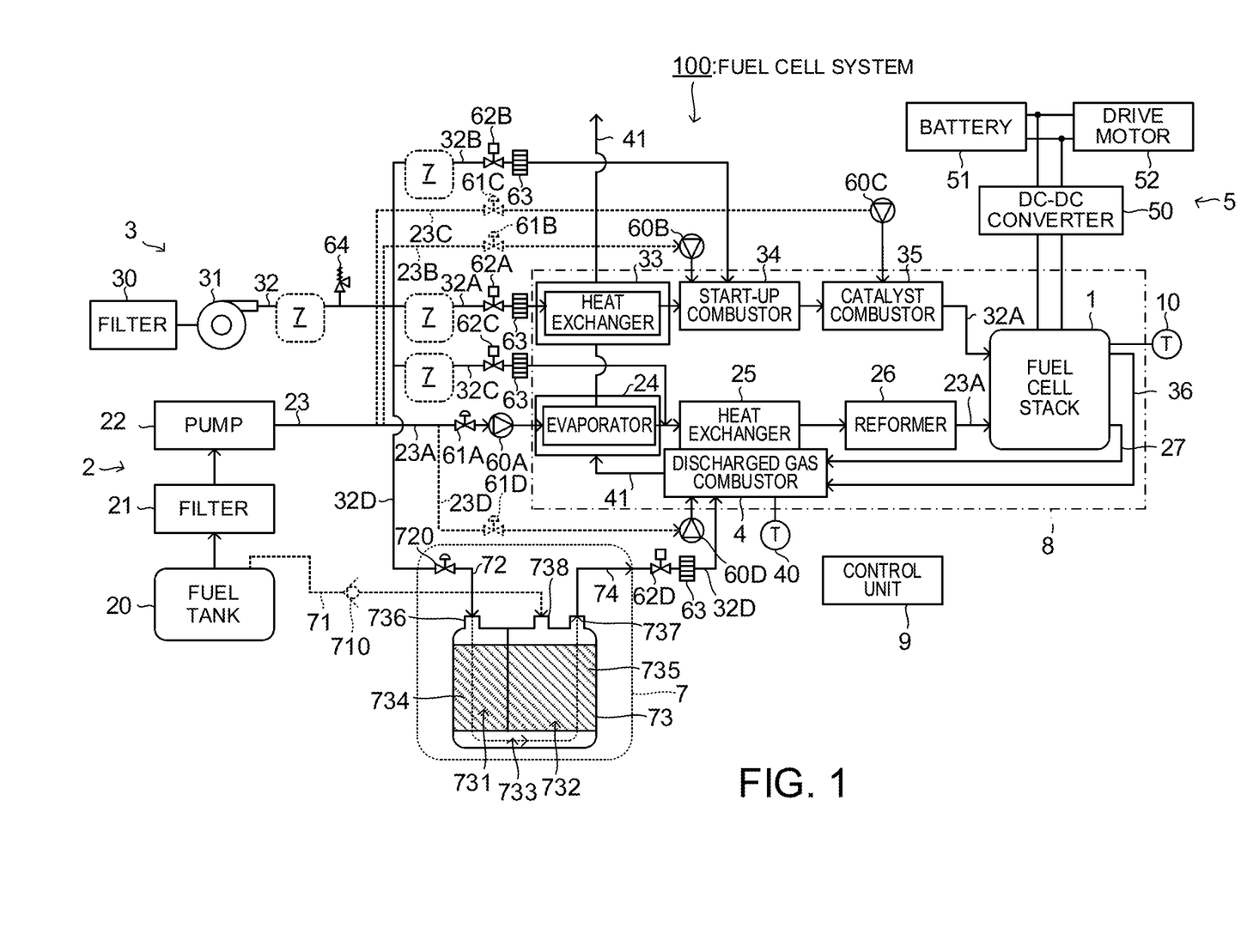
FIG. 1 is a block diagram illustrating the main configuration of a fuel cell system according to a first embodiment.

FIG. 1 is a block diagram illustrating the main configuration of a fuel cell system according to the first embodiment. A fuel cell system 100 according to the present embodiment includes: an anode gas supply system 2 (supply/discharge mechanism) configured to supply an anode gas (fuel gas) to a fuel cell stack 1; a cathode gas supply system 3 (supply/discharge mechanism) configured to supply a cathode gas (oxidant gas) to the fuel cell stack 1; a system discharge system (supply/discharge mechanism) configured to discharge a fuel off gas and an oxidation off gas discharged from the fuel cell stack 1; and a system drive system 5 configured to take out electric power from the fuel cell stack 1 to obtain power.

The anode gas supply system 2 is connected to a fuel tank 20 and includes a filter 21, a pump 22, an evaporator 24, a heat exchanger 25, a reformer 26, and the like, and a path 23 (path 23A) serially connecting these is connected to the fuel cell stack 1. In the anode gas supply system, the evaporator 24, the heat exchanger 25, and the reformer 26 constitute a fuel reforming system. The cathode gas supply system 3 is connected to a compressor 31 (oxidant gas supply source) and includes a heat exchanger 33, a start-up combustor 34, a catalyst combustor 35, and the like, and a path 32 (path 32A) serially-connecting these is connected to the fuel cell stack 1. In the cathode gas supply system 3, the start-up combustor 34 and the catalyst combustor 35 constitute a start-up combustion system. The system discharge system includes a discharged gas combustor 4 and the like. The system drive system 5 includes a DC-DC converter 50, a battery 51, a drive motor 52, and the like. Moreover, the fuel cell system 100 further includes a collection mechanism 7 to be described later connected to the fuel tank 20 and a control unit 9 that controls the overall operations of the fuel cell system.

Among the above components, the fuel cell stack 1 and the supply/discharge mechanism (the evaporator 24, the heat exchanger 25, the reformer 26, the heat exchanger 33, the start-up combustor 34, the catalyst combustor 35, and the discharged gas combustor 4) are accommodated in a heat-insulating case 8, and thus the release of heat to the outside is reduced to suppress the temperature decrease of these during common power generation.

The fuel cell stack 1 is a solid oxide fuel cell (SOFC) and is formed by stacking cells of which each obtained by sandwiching an electrolyte layer formed of solid oxide such as ceramic between an anode electrode (fuel electrode) to which anode gas reformed by the reformer 26 is supplied and a cathode electrode (air electrode) to which air containing oxygen is supplied as cathode gas.

Herein, an anode includes a passage in the fuel cell stack 1 configured to supply anode gas to the anode electrode and a passage in the fuel cell stack 1 configured to discharge anode off gas after a reaction on the anode electrode as well as the anode electrode that constitutes the fuel cell stack 1. Similarly, a cathode includes a passage in the fuel cell stack 1 configured to supply cathode gas to the cathode electrode and a passage in the fuel cell stack 1 configured to discharge cathode off gas after a reaction on the cathode electrode as well as the cathode electrode that constitutes the fuel cell stack 1.

The fuel cell stack 1 reacts therein hydrogen contained in the anode gas with oxygen in the cathode gas to generate electric power and discharges the anode off gas and cathode off gas generated after the reaction. Moreover, a temperature sensor 10 that measures the internal temperature of the fuel cell stack 1 is attached to the fuel cell stack 1.

The path 23A configured to supply anode gas to the anode of the fuel cell stack 1, the path 32A configured to supply combustion gas to the cathode of the fuel cell stack 1 during the start-up control of the fuel cell stack 1 and to supply cathode gas to the cathode of the fuel cell stack 1 during the power generation control, a discharged gas path 27 configured to introduce anode off gas (fuel off gas) discharged from the anode of the fuel cell stack 1 into the discharged gas combustor 4, and a discharged gas path 36 configured to introduce cathode off gas (oxidation off gas) discharged from the cathode of the fuel cell stack 1 into the discharged gas combustor 4 are connected to the fuel cell stack 1 (manifold).

The fuel tank 20 stores therein reforming fuel consisting of liquid obtained by mixing ethanol and water, for example, and the pump 22 sucks the reforming fuel and supplies the reforming fuel to a fuel supply system at a predetermined pressure. The filter 21 is placed between the fuel tank 20 and the pump 22 to remove dust in the reforming fuel sucked by the pump 22. In addition, the reforming fuel vaporizes and vaporized fuel is accumulated in the fuel tank 20. Therefore, a vapor line 71 introducing the vaporized fuel is provided on the upper portion of the fuel tank 20, and the vapor line 71 is connected to a collector 73 to be described later.

The path 23 configured to supply reforming fuel from the fuel tank 20 branches to the path 23A configured to supply the reforming fuel to the evaporator 24, a path 23B configured to supply fuel for combustion (reforming fuel) to the start-up combustor 34, a path 23C configured to supply the fuel for combustion to the catalyst combustor 35, and a path 23D configured to supply the fuel for combustion to the discharged gas combustor 4. An opening/closing valve 61A that can open and close the flow channel of the path 23A is attached at an upstream-side position of the reforming fuel from the evaporator 24 of the path 23A, and an injector 60A that injects the reforming fuel to the evaporator 24 is attached at its subsequent position.

Similarly, an opening/closing valve 61B is attached to the path 23B, and an injector 60B that injects the fuel for combustion to the start-up combustor 34 is attached at its subsequent position. An opening/closing valve 61C is attached to the path 23C, and an injector 60C that injects the fuel for combustion to the catalyst combustor 35 is attached at its subsequent position. An opening/closing valve 61D is attached to the path 23D, and an injector 60D that injects the fuel for combustion to the discharged gas combustor 4 is attached at its subsequent stage.

The opening/closing valve 61B opens the path 23B to circulate the fuel for combustion during the start-up control of the fuel cell system 100, and closes the path 23B after the end of the start-up control. Similarly, the opening/closing valve 61C opens the path 23C to circulate the fuel for combustion during the start-up control of the fuel cell system 100, and closes the path 23C after the end of the start-up control. Moreover, the opening/closing valve 61A closes the path 23A during the start-up control, but opens the path 23A after the end of the start-up control to circulate the reforming fuel. The opening/closing valve 61D opens the path 23D at a predetermined opening degree to circulate the fuel for combustion during the start-up control of the fuel cell system 100, but closes the path 23D when the discharged gas combustor 4 arrives at a predetermined temperature at which catalytic combustion can be performed.

The evaporator 24 vaporizes the reforming fuel by using the heat of the discharged gas discharged from the discharged gas combustor 4. The heat exchanger 25 is supplied with heat from the discharged gas combustor 4 and further heats the vaporized reforming fuel to reform the heated reforming fuel in the reformer 26.

The reformer 26 (fuel reforming mechanism) reforms the reforming fuel to anode gas containing hydrogen by using a catalytic reaction and supplies the anode gas to the anode of the fuel cell stack 1.

The compressor 31 takes in the outside air through the filter 30 and supplies air to the fuel cell stack 1. A relief valve 64 is attached to the path 32 configured to supply air discharged by the compressor 31. When a pressure in the path 32 exceeds a predetermined value, the relief valve 64 opens the path 32 to avoid a predetermined amount or more of load with respect to the compressor 31. Moreover, the path 32 branches to the path 32A configured to supply air (cathode gas) to the heat exchanger 33, a path 32B configured to supply air to the start-up combustor 34, a path 32C configured to supply air to the heat exchanger 25 (the reformer 26), and a path 32D configured to supply air to the discharged gas combustor 4.

A throttle 62A is attached to the path 32A, a throttle 62B is attached to the path 32B, a throttle 62C is attached to the path 32C, and a throttle 62D is attached to the path 32D to be able to adjust the respective flow rates of air (cathode gas) by the control of the control unit 9. Furthermore, a flashback arrester 63 configured to dam up flame is attached at a downstream-side position of air from each throttle of each path.

The throttle 62A opens the path 32A to circulate a predetermined amount of air during the start-up control of the fuel cell stack 1, but closes the path 32A after the end of the start-up control. Similarly, the throttle 62B opens the path 32B to circulate a predetermined amount of air during the start-up control of the fuel cell stack 1, but closes the path 32B after the end of the start-up control. The throttle 62C does not open the path 32C during the start-up control of the fuel cell stack 1 but opens the path 32C to circulate a predetermined amount of air (oxygen for reformulation adjustment) if needed during the power generation control of the fuel cell stack 1. The throttle 62D opens the path 32D to circulate a predetermined amount of air during the start-up control of the fuel cell stack 1, but closes the path 32D when the discharged gas combustor 4 arrives at the temperature at which catalytic combustion can be performed.

The heat exchanger 33 heats air for combustion gas or air for cathode gas by using the heat of discharged gas discharged from the discharged gas combustor 4.

The start-up combustor 34 is supplied with the air heated by the heat exchanger 33 and the fuel for combustion supplied from the injector 60B to mix both during the start-up control of the fuel cell system 100. Then, a mixture of the air and the fuel for combustion is ignited by an ignition device attached to the start-up combustor 34 to generate high-temperature combustion gas. Moreover, air is introduced into the start-up combustor 34 from the path 32B and mixed gas of the combustion gas and the air is supplied to the catalyst combustor 35.

During the start-up control of the fuel cell system 100, the catalyst combustor 35 mixes mixed gas of the air and combustion gas supplied from the start-up combustor 34 with the fuel for combustion supplied from the injector 60C to generate a great amount of combustion gas by using a catalytic reaction and supplies the generated combustion gas to the fuel cell stack 1. Herein, the catalyst combustor 35 heats a catalyst by using the mixed gas supplied from the start-up combustor 34, but may heat a catalyst by using a heater.

After the end of the start-up control, the generation of combustion gas is terminated, and air passing through the heat exchanger 33, the start-up combustor 34, and the catalyst combustor 35 is continuously used as cathode gas and is supplied to the fuel cell stack 1 to transfer to the power generation control.

During the power generation control, the discharged gas combustor 4 mixes the anode off gas supplied from the discharged gas path 27 with the cathode off gas supplied from the discharged gas path 36 to combust its mixed gas by using a catalyst, generates discharged gas containing carbon dioxide and water as the main components, and transmits heat caused by catalytic combustion to the heat exchanger 25 etc. Moreover, during the start-up control, the discharged gas combustor 4 mixes the fuel for combustion supplied from the injector 60D with the air supplied from the path 32D, combusts this mixed gas by using the attached ignition device, and generates discharged gas similar to the above. Furthermore, the discharged gas combustor 4 is connected to a discharge path 41 configured to discharge the discharged gas after combustion, and the discharge path 41 passes through the evaporator 24 and the heat exchanger 33 and is connected to a muffler (not illustrated). Therefore, the evaporator 24 and the heat exchanger 33 are heated by the discharged gas. In addition, a temperature sensor 40 that measures the temperature of the discharged gas combustor 4 is attached to the discharged gas combustor 4.

The collection mechanism 7 includes the vapor line 71 (introduction path) connected to the fuel tank 20, the collector 73 configured to collect the vaporized fuel supplied from the vapor line 71, a supply path 72 configured to supply gas for purge (air) to the collector 73, and a discharge path 74 configured to discharge the purge gas from the collector 73. In FIG. 1, the supply path 72 and the discharge path 74 are incorporated into the path 32D. Herein, a purge gas supply unit of the collection mechanism 7 also serves as the compressor 31.

A backflow prevention valve 710 is attached to the vapor line 71. The backflow prevention valve 710 is a valve configured to open and close the vapor line by using a pressure difference. The backflow prevention valve opens the vapor line 71 when the pressure of the fuel tank 20 side is high, and conversely closes the vapor line 71 when the pressure of the collector 73 side is high. Therefore, the circulation of vaporized fuel from the fuel tank 20 toward the collector 73 is allowed, but the circulation of its backward-direction gas for purge (purge gas) etc. is prohibited.

An opening/closing valve 720 is attached to the supply path 72. The opening/closing valve 720 opens the supply path 72 when turning on the throttle 62D. In the stop control of the fuel cell stack 1, the opening/closing valve 720 closes the supply path 72 after that the compressor 31 is turned off.

The collector 73 collects the vaporized fuel supplied from the vapor line 71. The collector 73 is partitioned into a front chamber 731 and a rear chamber 732, and the front chamber 731 and the rear chamber 732 communicate with each other by a connection passage 733. An inlet port 736 to which the supply path 72 is connected is provided on the front chamber 731 and a discharge port 737 to which the discharge path 74 is connected is provided on the rear chamber 732. Moreover, a connection port 738 to which the vapor line 71 is connected is provided on the rear chamber 732.

The front chamber 731 is filled up with a canister 734 formed of activated carbon etc. Similarly, the rear chamber 732 is filled up with a canister 735. The canisters 734 and 735 adsorb thereto the vaporized fuel supplied from the vapor line 71, but detach the adsorbed adsorption fuel by introducing gas for purge.

In a stage where the vaporized fuel begins to be adsorbed, the vaporized fuel adsorbed in the canister 735 of the rear chamber 732 is distributed near the connection port 738 in the canister 735. Then, depending on an increase in the adsorption amount of the vaporized fuel, the distribution of the vaporized fuel inside the canister 735 expands toward the connection passage 733, and the vaporized fuel arriving at the connection passage 733 passes through the connection passage 733 and arrives at and is adsorbed to the canister 734 of the front chamber 731. The vaporized fuel adsorbed to the canister 734 is initially distributed near the connection passage 733 in the canister 734, but its distribution expands toward the inlet port 736 in the canister 734 depending on an increase in the adsorption amount.

On the other hand, when introducing gas for purge from the inlet port 736, the gas for purge penetrates into the front chamber 731 and arrives at the connection passage 733 through the canister 734. Then, the gas for purge penetrates into the rear chamber 732 and is discharged from the discharge port 737 through the canister 735. On this occasion, the vaporized fuel adsorbed to the canisters 734 and 735 is detached from the canisters 734 and 735 by the gas for purge, and the detached vaporized fuel is contained in the purge gas and is discharged from the discharge port 737. In addition, because a pressure caused by the gas for purge (purge gas) is applied to the backflow prevention valve 710 through the connection port 738 regardless of the open/closed state of the throttle 62D when the compressor 31 is in an ON state, the backflow prevention valve 710 closes the vapor line 71.

As described above, the supply path 72 and the discharge path 74 of the collection mechanism 7 are incorporated into and united with the path 32D, and the discharge path 74 is connected to the discharged gas combustor 4. For this reason, during the start-up control of the fuel cell stack 1, the discharged gas combustor 4 is supplied with the fuel for combustion from the path 23D and the gas for purge from the path 32D. Because the vaporized fuel is contained in the purge gas discharged from the collector 73, the supplied amount of the fuel for combustion to be supplied from the path 32D can be reduced that much.

In the meantime, the present embodiment has a configuration that the collection mechanism 7 (the collector 73) is placed outside of the heat-insulating case 8 and the discharge path 74 (the path 32D) penetrates through the heat-insulating case 8. As a result, because the collection mechanism 7 is substantially thermally insulated from a heat source such as the fuel cell stack 1 and the discharged gas combustor 4, it is possible to avoid the deterioration of the canisters 734 and 735 due to heat.

As illustrated in FIG. 1, in the present embodiment, the collection mechanism 7 (the collector 73) can be incorporated into the path 32A, the path 32B, the path 32C, or the path 32 besides the path 32D. When the collection mechanism 7 is incorporated into the path 32A, the supply path 72 and the discharge path 74 are united with the path 32A and thus are connected to the heat exchanger 33. When the collection mechanism 7 is incorporated into the path 32B, the supply path 72 and the discharge path 74 are united with the path 32B and thus are connected to the start-up combustor 34. When the collection mechanism 7 is incorporated into the path 32C, the supply path 72 and the discharge path 74 are united with the path 32C and thus are connected to the heat exchanger 25 (the reformer 26). When the collection mechanism 7 is incorporated into the path 32, the supply path 72 and the discharge path 74 are united with the path 32 and then are branched, and consequently are connected to the heat exchanger 33, the start-up combustor 34, the heat exchanger 25 (the reformer 26), and the discharged gas combustor 4. Furthermore, the supply path 72 of the collection mechanism 7 can be incorporated into at least one of the path 32 and the path 32A to the path 32D and the discharge path 74 can be connected to the discharged gas path 27 and/or the discharged gas path 36. Moreover, among the components of the collection mechanism 7, the supply path 72 is branched from the path 32 and the discharge path 74 is delinked from the path 32 and is optionally branched to join at least two of the path 32A, the path 32B, the path 32C, and the path 32D.

When the collection mechanism 7 is incorporated into the path 32A, the vaporized fuel can be discharged into the path 32A during the start-up control and the power generation control of the fuel cell stack 1. The vaporized fuel discharged from the collection mechanism 7 is heated by the heat exchanger 33. During the start-up control, the vaporized fuel is combusted in the start-up combustor 34 or the catalyst combustor 35. Therefore, the supplied amount of the fuel for combustion to the start-up combustor 34 and the catalyst combustor 35 can be reduced that much. On the other hand, during the power generation control, the vaporized fuel passes through the fuel cell stack 1 and is combusted in the discharged gas combustor 4.

When the collection mechanism 7 is incorporated into the path 32B, it is possible to discharge the vaporized fuel into the path 32A to supply it to the start-up combustor 34 during the start-up control of the fuel cell stack 1. Therefore, the supplied amount of the fuel for combustion to the start-up combustor 34 and the catalyst combustor 35 can be reduced that much.

When the collection mechanism 7 is incorporated into the path 32C, it is possible to discharge the vaporized fuel into the path 32C to supply it to the heat exchanger 25 (the reformer 26) during the power generation control of the fuel cell stack 1. Therefore, the supplied amount of the reforming fuel to the reformer 26 can be reduced that much.

When the collection mechanism 7 is incorporated into the path 32, the vaporized fuel can be discharged into the path 32 during the start-up control and the power generation control of the fuel cell stack 1. At this time, the discharge path 74 is branched and consequently is connected to the discharged gas combustor 4, the start-up combustor 34, the heat exchanger 33, and the reformer 26. Due to the incorporation in this way, because the supply destination of the vaporized fuel collected by the collection mechanism 7 is dispersed and thus the vaporized fuel to be supplied to the supply destination becomes smaller that much, the change of state of the device located at the supply destination can be made smaller to stably activate the whole system. Moreover, because the flow rate of air (gas for purge) from the compressor 31 is the most, the vaporized fuel can be efficiently discharged from the canisters 734 and 735.

In any case, the present embodiment requires a configuration to combust the vaporized fuel collected by the collection mechanism 7 to discharge it to the outside. For this reason, the discharge path 74 at least only needs to be connected to an upstream-side position from an outlet of the discharged gas combustor 4 in the supply/discharge mechanism described above, namely, in the paths (the path 23, the paths 23A to 23D, and the discharged gas path 27) through which anode gas circulates or the paths (the path 32, the paths 32A to 32D, and the discharged gas path 36) through which cathode gas circulates.

The DC-DC converter 50 is connected to the fuel cell stack 1, and raises the output voltage of the fuel cell stack 1 to supply electric power to the battery 51 or the drive motor 52. The battery 51 is charged with electric power supplied from the DC-DC converter 50 and supplies the electric power to the drive motor 52. The drive motor 52 is connected to the battery 51 and the DC-DC converter 50 via an inverter (not illustrated), and acts as a power source of a vehicle. Moreover, during braking the vehicle, the drive motor 52 generates regenerative electric power and the battery 51 can be charged with this electric power.

The battery 51 and the drive motor 52 act as a load connected to the fuel cell stack 1 via the DC-DC converter 50. On the other hand, auxiliary machines, such as the pump 22 and the compressor 31, to make the fuel cell stack 1 generate electric power can be connected to the fuel cell stack 1 as a load to be driven by the supply of power from the fuel cell stack 1, but may be driven by the supply of power from the battery 51.

The control unit 9 is configured to include general-purpose electronic circuit and peripheral device that include a microcomputer, a microprocessor, and/or a CPU, and executes a specified program to execute a process for controlling the fuel cell system 100. Moreover, the control unit 9 can perform the drive/stop control (ON/OFF control) for components that constitutes the fuel cell system 100. The control of the fuel cell system 100 that is performed by the control unit 9 as described below includes the start-up control for performing heating so that the fuel cell stack 1 can generate electric power, the power generation control for performing normal power generation, and the stop control for stopping the system. In addition, in order to suppress the deterioration of the anode (the anode electrode), the stop control of the fuel cell stack 1 requires to apply a voltage about the open voltage of the fuel cell stack 1 as a protective voltage. For this reason, after connecting a protection circuit (not illustrated) configured to apply this protective voltage to the fuel cell stack 1, the control unit 9 may drive the protection circuit (not illustrated) during the stop control of the fuel cell stack 1.

Procedure of Start-Up Control of Fuel Cell System

Figure 2:
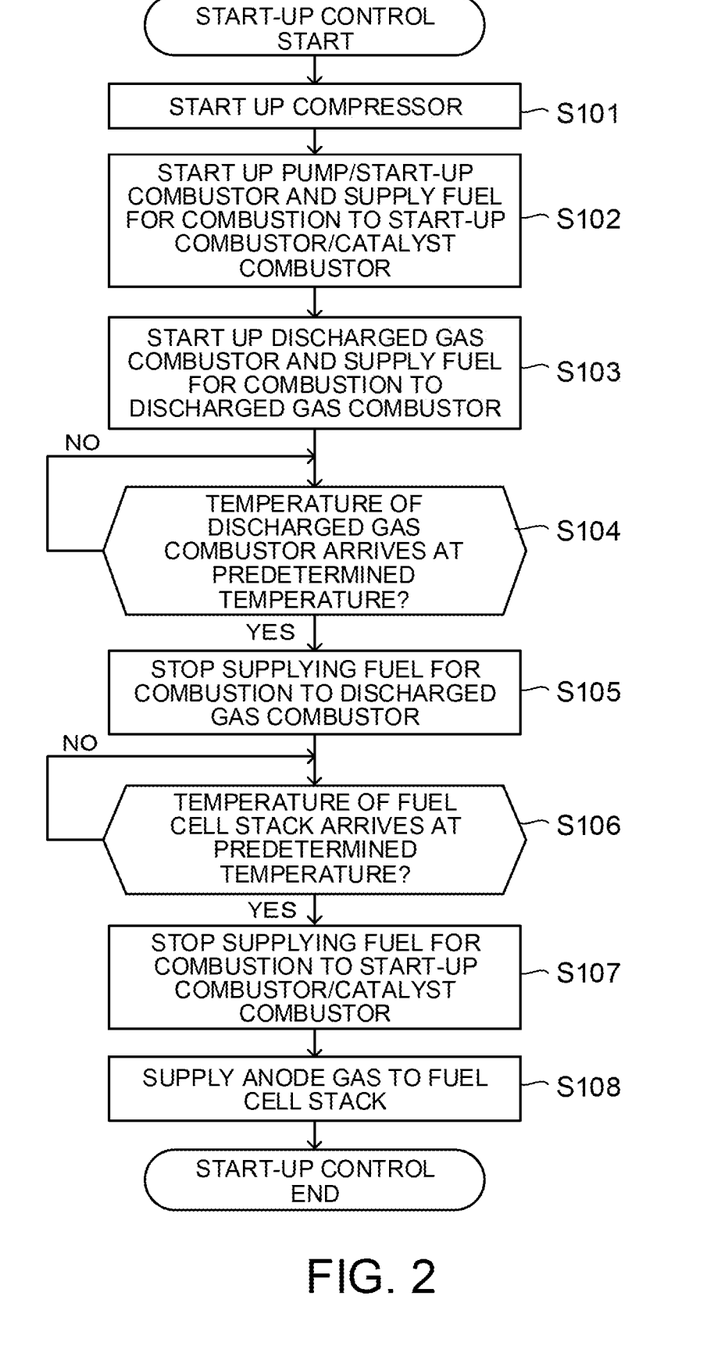
FIG. 2 is a flowchart illustrating the procedure of a start-up control of the fuel cell system according to the first embodiment.

Next, the procedure of the start-up control of the fuel cell system 100 will be explained in accordance with a flowchart illustrated in FIG. 2. In an initial state, the opening/closing valves 61A to 61D and the throttles 62A to 62D are turned off. As illustrated in FIG. 2, when the system starts the start-up control, the control unit 9 turns on the compressor 31, the throttle 62A, and the throttle 62B at a constant opening degree in Step S101. As a result, air is supplied to the path 32, the path 32A, and the path 32B.

In Step S102, the control unit 9 turns on the pump 22 and the start-up combustor 34, and turns on the opening/closing valve 61B, the opening/closing valve 61C, and the opening/closing valve 61D. As a result, the start-up combustor 34 generates combustion gas, and the catalyst combustor 35 generates a large amount of combustion gas and supplies it to the fuel cell stack 1 to heat the fuel cell stack 1. Then, the combustion gas (discharged gas) passing through the fuel cell stack 1 arrives at the discharged gas combustor 4 through the discharged gas path 36.

In Step S103, the control unit 9 turns on the discharged gas combustor 4, the opening/closing valve 61D, the opening/closing valve 720, and the throttle 62D. As a result, the air (gas for purge) supplied from the path 32D is mixed with the fuel for combustion supplied from the path 32D and the mixed gas is combusted to generate discharged gas. Herein, the air (purge gas) passing through the collector 73 contains vaporized fuel, but this vaporized fuel is also combusted in the discharged gas combustor 4. The discharged gas generated from the discharged gas combustor 4 heats the discharged gas combustor 4 itself. Moreover, the discharged gas combustor 4 is also heated by the combustion gas (discharged gas) discharged from the fuel cell stack 1. The heat generated in the discharged gas combustor 4 is transmitted to the heat exchanger 25 and the reformer 26. Then, the discharged gas discharged from the discharged gas combustor 4 is discharged to the outside through the evaporator 24 and the heat exchanger 33. Therefore, the evaporator 24 and the heat exchanger 33 are heated by the discharged gas. In addition, Steps S102 and S103 may be simultaneously performed.

In Step S104, based on the temperature measured by the temperature sensor 40, the control unit 9 determines whether the temperature of the discharged gas combustor 4 arrives at a predetermined temperature at which catalytic combustion can be performed. The control unit transfers to the next Step S105 if it is YES (positive), and maintains the state after Step S103 if it is NO (negative).

In Step S105, the control unit 9 turns off the ignition device of the discharged gas combustor 4 and turns off the opening/closing valve 61D and the throttle 62D. As a result, the discharge of the vaporized fuel from the collection mechanism 7 is stopped. On the other hand, the discharged gas combustor 4 is continuously heated by the combustion gas (discharged gas) supplied from the fuel cell stack 1.

In Step S106, based on the temperature measured by the temperature sensor 10, the control unit 9 determines whether the temperature of the fuel cell stack 1 arrives at a predetermined temperature at which power generation can be performed. The control unit transfers to the next Step S107 if it is YES (positive), and maintains the state after Step S105 if it is NO (negative).

In Step S107, the control unit 9 turns off the opening/closing valve 61B and the opening/closing valve 61C to stop supplying the fuel for combustion to the start-up combustor 34 and the catalyst combustor 35 and turns off the throttle 62B to stop supplying the air to the start-up combustor 34, so as to stop generating the combustion gas. On the other hand, the control unit 9 maintains the ON state of the throttle 62A. As a result, the air (cathode gas) heated by the heat exchanger 33 is supplied to the fuel cell stack 1.

In Step S108, the control unit 9 turns on the opening/closing valve 61A to supply the reforming fuel to the evaporator 24. As a result, the reforming fuel is heated and vaporized in the evaporator 24, is further heated in the heat exchanger 25, and is reformed to anode gas in the reformer 26 and then is supplied to the fuel cell stack 1. According to this, because the fuel cell stack 1 enters a state where power generation can be performed by the anode gas supplied to the anode and the cathode gas supplied to the cathode, the control unit terminates the start-up control.

Operations During Power Generation Control of Fuel Cell System

Next, operations during the power generation control of the fuel cell system 100 will be explained. During the power generation control of the system, the reforming fuel supplied from the fuel tank 20 is first reformed to anode gas by the reformer 26 and is supplied to the anode of the fuel cell stack 1. On the other hand, air acting as cathode gas is heated by the heat exchanger 33 and is supplied to the cathode of the fuel cell stack 1.

The fuel cell stack 1 supplied with the anode gas and cathode gas generates electric power by using an electrochemical reaction and supplies the electric power in accordance with the required power of the battery 51 and the drive motor 52 (the DC-DC converter 50) and the further required power of auxiliary machines such as the pump 22 and the compressor 31, and introduces the anode off gas and cathode off gas used for the electrochemical reaction into the discharged gas combustor 4.

The discharged gas combustor 4 combusts the anode off gas and cathode off gas in a state where they are mixed to generate discharged gas. The discharged gas passes through the evaporator 24 and the heat exchanger 33 while heating them and is discharged to the outside. At this time, as illustrated in FIG. 1, when the collection mechanism 7 is incorporated into the path 32C, the control unit 9 turns on the throttle 62C if needed so as to be able to supply the vaporized fuel to the reformer 26.

Procedure of Stop Control of Fuel Cell System

Figure 3:
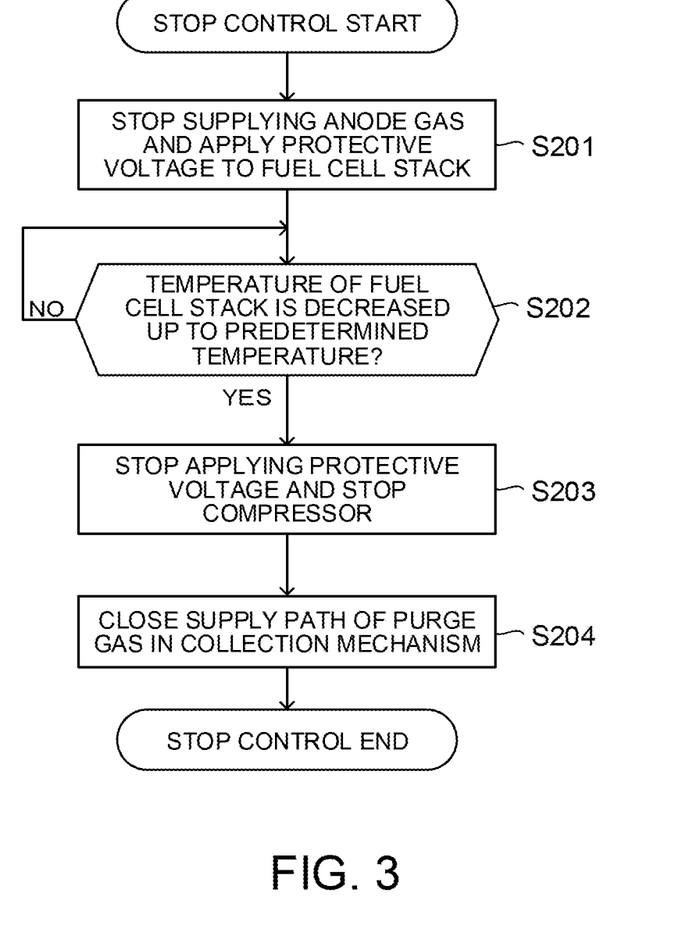
FIG. 3 is a flowchart illustrating the procedure of a stop control of the fuel cell system according to the first embodiment.

Next, the procedure of the stop control of the fuel cell system 100 will be explained in accordance with a flowchart illustrated in FIG. 3. When the system starts the stop control, the control unit 9 turns off the pump 22 and turns off the opening/closing valve 61A to stop supplying the anode gas in Step S201. As a result, the power generation of the fuel cell stack 1 is stopped. Moreover, the control unit 9 maintains the ON state of the throttle 62A. As a result, the cathode gas is continuously introduced into the fuel cell stack 1 as coolant gas, and thus the temperature of the fuel cell stack 1 is decreased. Furthermore, the control unit drives the protection circuit (not illustrated) configured to apply a protective voltage to the fuel cell stack 1. As a result, the deterioration of the anode electrode is avoided.

In Step S202, based on the temperature measured by the temperature sensor 10, the control unit 9 determines whether the temperature of the fuel cell stack 1 is decreased up to an upper limit temperature at which the deterioration of the anode can be avoided. The control unit maintains the state after Step S201 when determining that it is NO (negative), and transfers to the next Step S203 when determining that it is YES.

In Step S203, the control unit 9 turns off the protection circuit (not illustrated) to stop applying the protective voltage. Moreover, the control unit 9 turns off the compressor 31 and the throttle 62A. As a result, the pressure in the path 32 and the paths 32A to 32D returns to atmospheric pressure, and thus becomes the same as a pressure in the fuel tank 20 or becomes smaller than the pressure in the fuel tank. Therefore, the backflow prevention valve 710 opens the vapor line, and thus the vaporized fuel that is vaporized in the fuel tank 20 again arrives at the collection mechanism 7 through the vapor line 71 to make the collection mechanism 7 restart the collection of the vaporized fuel.

In Step S204, the control unit 9 turns off the opening/closing valve 720 of the collection mechanism 7 to close the supply path 72 of the gas for purge in the collection mechanism 7. As a result, the compressor 31 is prevented from being deteriorated due to the arrival of the vaporized fuel, which is discharged from the canisters 734 and 735 and is discharged from the inlet port 736, at the compressor 31. According to this, the stop control of the fuel cell stack 1 is terminated.

Effects of First Embodiment

As described above, the fuel cell system 100 according to the first embodiment includes: the fuel cell stack 1 that is supplied with anode gas and cathode gas to generate electric power; the fuel tank 20 that stores therein liquid fuel acting as the anode gas; the compressor 31 that supplies the cathode gas; and the supply/discharge mechanism (the evaporator 24, the heat exchanger 25, the reformer 26, the heat exchanger 33, the start-up combustor 34, the catalyst combustor 35, and the discharged gas combustor 4) that is connected to the fuel tank 20 and the compressor 31, the supply/discharge mechanism being configured to supply/discharge the fuel gas and the oxidant gas to/from the fuel cell stack 1. The fuel cell system 100 further includes: the collector 73 configured to collect vaporized fuel that is vaporized in the fuel tank 20; the vapor line 71 that is connected to the fuel tank 20 and the collector 73 to guide the vaporized fuel to the collector 73; the discharge path 74 configured to discharge the vaporized fuel collected by the collector 73 to the supply/discharge mechanism; and the supply pass 72 and the purge gas supply unit (the compressor 31) that are connected to the collector 73 to supply to the collector 73 the gas for purge for pushing out the vaporized fuel collected by the collector 73 into the discharge path 74.

As a result, because the purge gas supply unit (the compressor 31) does not directly touch fuel, the deterioration of the purge gas supply unit can be avoided. Furthermore, because the purge gas supply unit (the compressor 31) does not communicate with the reformer 26 etc. close to the fuel cell stack 1, the purge gas supply unit can also avoid being deteriorated due to heat from the fuel cell stack 1 and the reformer 26.

The purge gas supply unit also serves as the compressor 31, and the cathode gas is supplied to the collector 73 as the gas for purge. As a result, because a supply source to supply cathode gas and a supply source to supply gas for purge are united with each other, the whole system can be downsized.

The supply/discharge mechanism includes the discharged gas combustor 4 that is placed at the downstream-side position from the fuel cell stack 1, and the discharge path 74 is configured to supply the vaporized fuel to the discharged gas combustor 4. As a result, the discharged gas combustor 4 having high combustion efficiency can surely combust the vaporized fuel collected by the collector 73.

The supply/discharge mechanism includes the start-up combustor 34 that is placed at a position between the compressor 31 and the fuel cell stack 1 and mixes the fuel for combustion with the cathode gas and ignites the mixture to generate combustion gas and supply it to the fuel cell stack 1, and the discharge path 74 is configured to discharge the vaporized fuel to the start-up combustor 34. As a result, during the start-up control of the fuel cell system 100, the vaporized fuel collected by the collector 73 can be surely combusted in the start-up combustor 34. Moreover, the supplied amount of the fuel for combustion to the start-up combustor 34 can be reduced as much as the vaporized fuel is supplied thereto.

The supply/discharge mechanism includes: the heat exchanger 33 that is placed at a position between the compressor 31 and the fuel cell stack 1 to heat cathode gas by using the discharged gas discharged from the fuel cell stack 1; and the catalyst combustor 35 that is placed at a position between the heat exchanger 33 and the fuel cell stack 1 and mixes the fuel for combustion with the cathode gas to generate combustion gas and supply it to the fuel cell stack 1, and the discharge path 74 is configured to discharge the vaporized fuel to the heat exchanger 33. As a result, the vaporized fuel collected by the collection mechanism 7 can be combusted by the discharged gas combustor 4 at least located at the downstream side from the path 32A. Moreover, during the start-up control of the fuel cell system 100, because the vaporized fuel (vaporized fuel that is not combusted in the start-up combustor 34) heated in the heat exchanger 33 is supplied to the catalyst combustor 35, it is possible to raise the combustion efficiency of the vaporized fuel.

The supply/discharge mechanism includes the reformer 26 that is placed at a position between the fuel tank 20 and the fuel cell stack 1 to reform liquid fuel to anode gas, and the discharge path 74 is configured to discharge the vaporized fuel to the reformer 26. As a result, during the power generation control of the fuel cell system 100, the vaporized fuel collected by the collector 73 can be surely reformed in the reformer 26. Moreover, the supplied amount of the reforming fuel to the reformer 26 can be reduced as much as the vaporized fuel is supplied thereto.

The supply/discharge mechanism includes: the discharged gas combustor 4 that is placed at the downstream-side position from the fuel cell stack 1 and the heat exchanger 25 that is placed at a position between the fuel tank 20 and the reformer 26 to heat liquid fuel by using heat from the discharged gas combustor 4 during the combustion of discharged gas, and the discharge path 74 is configured to supply the vaporized fuel upstream of the heat exchanger 25. As a result, it is possible to raise the reforming efficiency of vaporized fuel in the reformer 26 because the vaporized fuel discharged from the collector 73 is heated by the heat exchanger 25.

The supply/discharge mechanism includes: the discharged gas combustor 4 that is placed at the downstream-side position from the fuel cell stack 1; the reformer 26 that is placed at a position between the fuel tank 20 and the fuel cell stack 1 to reform liquid fuel to anode gas; the heat exchanger 33 that is placed at a position between the compressor 31 and the fuel cell stack 1 to heat cathode gas by using discharged gas discharged from the fuel cell stack 1; and the start-up combustor 34 that is placed at a position between the heat exchanger 33 and the fuel cell stack 1 and mixes the fuel for combustion with the cathode gas heated by the heat exchanger 33 and ignites the mixture to generate combustion gas and supply the combustion gas to the fuel cell stack 1. The discharge path 74 is configured to discharge the vaporized fuel to at least two of the reformer 26, the heat exchanger 33, the start-up combustor 34, and the discharged gas combustor 4. As a result, because the discharge destination of the vaporized fuel collected by the collector 73 is dispersed and thus the vaporized fuel to be supplied to the discharge destination becomes smaller that much, the change of state of the device located at the discharge destination can be made smaller to stably activate the whole system.

The supply/discharge mechanism includes: the discharged gas combustor 4 that is placed at the downstream-side position from the fuel cell stack 1; the fuel reforming mechanism (the evaporator 24, the heat exchanger 25, and the reformer 26) that is placed at a position between the fuel tank 20 and the fuel cell stack 1 to heat liquid fuel and reform it to anode gas; the heat exchanger 33 that is placed at a position between the compressor 31 and the fuel cell stack 1 to heat cathode gas; the start-up combustion system (the start-up combustor 34 and the catalyst combustor 35) that is placed at a position between the heat exchanger 33 and the fuel cell stack 1 and mixes the fuel for combustion with the cathode gas heated by the heat exchanger 33 and ignites the mixture to generate combustion gas and supply the combustion gas to the fuel cell stack 1; and the heat-insulating case 8 that accommodates the fuel cell stack 1, the fuel reforming mechanism, the heat exchanger 33, the start-up combustion system, and the discharged gas combustor 4. The collection mechanism 7 is placed outside of the heat-insulating case 8, and the discharge path 74 penetrates through the heat-insulating case 8. As a result, because the collection mechanism 7 is substantially thermally insulated from a heat source such as the fuel cell stack 1 and the discharged gas combustor 4, the collection mechanism 7 (the canisters 734 and 735) can avoid being deteriorated due to heat. In addition, the heat-insulating case 8 may be configured to accommodate at least the fuel cell stack 1 and the discharged gas combustor 4.

Second Embodiment

Figure 4:
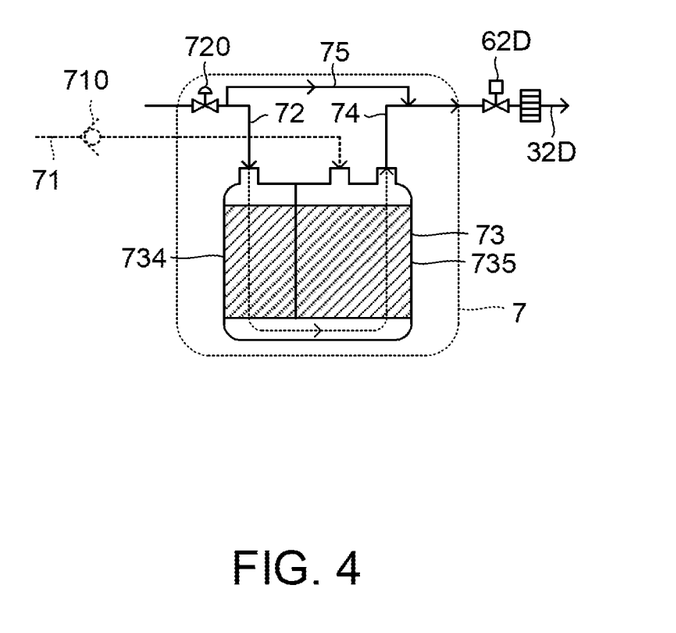
FIG. 4 is a block diagram illustrating the main configuration of a fuel cell system according to a second embodiment.

FIG. 4 is a block diagram illustrating the main configuration of a fuel cell system according to the second embodiment. The illustration of surrounding components of the collection mechanism 7 is omitted in the second embodiment (third embodiment, fourth embodiment). The basic configuration according to the second embodiment is common to that of the first embodiment, but the configuration of the collection mechanism 7 is different from that of the first embodiment.

The collection mechanism 7 includes a first bypass line 75 that is connected to the supply path 72 and the discharge path 74 to bypass the collector 73. The first bypass line 75 is connected to the downstream-side position from the opening/closing valve 720 of the supply path 72. The first bypass line 75 has an inside diameter etc. that are designed so that the pressure loss of the gas for purge is smaller than the collector 73 and the flow rate of the gas for purge is larger than the collector 73. As a result, because the pressure loss of the path supplying air (cathode gas) through the collector 73 is reduced, the burden of the compressor 31 (FIG. 1) can be reduced. Moreover, because a large pressure is not also applied to the collector 73, a burden on the collector 73 (the canisters 734 and 735) can be reduced.

Moreover, the first bypass line 75 has an inside diameter etc. that are designed so that the pressure loss of the gas for purge is smaller than the collector 73 and the flow rate of the gas for purge is larger than the collector 73. As a result, even if the supplied amount of cathode gas of the compressor 31 is large, the collector 73 can be protected from the pressure of cathode gas.

Third Embodiment

Figure 5:
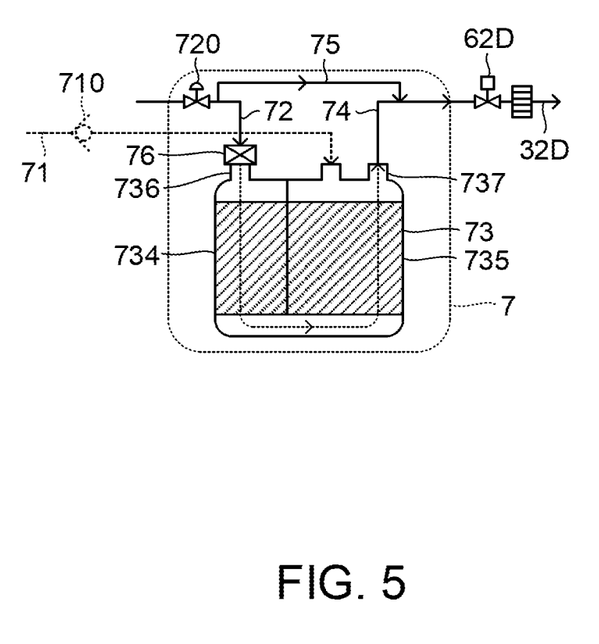
FIG. 5 is a block diagram illustrating the main configuration of a fuel cell system according to a third embodiment.

FIG. 5 is a block diagram illustrating the main configuration of a fuel cell system according to the third embodiment. The basic configuration according to the third embodiment is common to that of the second embodiment, but a valve 76 is provided at the inlet port 736 of the collector 73.

The vaporized fuel collected by the collector 73 can be discharged by supplying gas for purge to the collector 73. However, when the gas for purge is supplied to the collector 73, the distribution density of the vaporized fuel inside the canisters 734 and 735 becomes thin. For this reason, the discharge amount of the vaporized fuel from the collector 73 is decreased with the passage of time. Therefore, when discharging the vaporized fuel from the collector 73, the present embodiment initially sets the opening degree of the valve 76 to a low value to lower the supplied amount of the gas for purge to be introduced into the collector 73 and then makes the opening degree of the valve 76 larger to increasingly increase the supplied amount of the gas for purge with the passage of time. As a result, the time-direction unevenness of the discharge amount of the vaporized fuel can be suppressed to stabilize the control of the device located at the discharge destination.

The control unit 9 (FIG. 1) turns on the opening/closing valve 720 and the throttle 62D and turns on the valve 76, but initially performs control of making their opening degrees smaller and increasingly making their opening degrees larger with the passage of time. In addition, in FIG. 5, the valve 76 is attached to the inlet port 736, but may be attached to the discharge port 737 or may be attached to the inlet port 736 and the discharge port 737.

Fourth Embodiment

Figure 6:
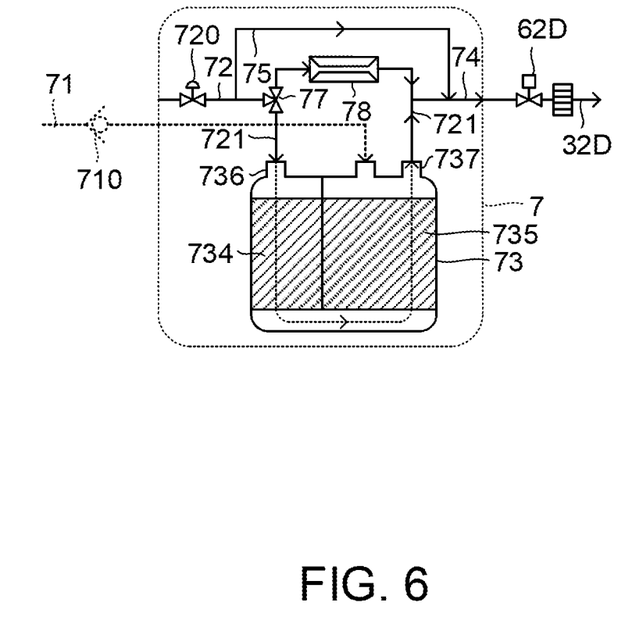
FIG. 6 is a block diagram illustrating the main configuration of a fuel cell system according to a fourth embodiment.

FIG. 6 is a block diagram illustrating the main configuration of a fuel cell system according to the fourth embodiment. The basic configuration according to the fourth embodiment is common to that of the second embodiment, but the supply path 72 branches to a second bypass line 78 and a branch path 721 circulating through the collector 73 by using a three-way valve 77 (changeover valve) as a branching point. The branch path 721 and the second bypass line 78 join each other at the discharge path 74.

The three-way valve 77 is controlled by the control unit 9 (FIG. 1), and causes the circulation path communicating with the supply path 72 to switch between the branch path 721 and the second bypass line 78 or adjusts a circulation ratio of air between the branch path 721 and the second bypass line 78.

The second bypass line 78 includes a component such as a damper such that the pressure loss of gas for purge is substantially equal to that of the collector 73 and the flow rate of gas for purge is substantially the same as that of the collector 73.

In the present embodiment, the three-way valve 77 fully opens the second bypass line 78 in an initial state. As a result, the collector 73 is opened only with respect to the fuel tank 20, and thus the vaporized fuel can be adsorbed to the canisters 734 and 735. At this time, the control unit turns on the compressor 31, the opening/closing valve 720, and the throttle 62D so as to make air circulate through the first and second bypass lines 75 and 78. At this time, air is introduced into the discharge port 737 from the first and second bypass lines 75 and 78, and the backflow prevention valve 710 closes the vapor line 71 due to the pressure of the air.

In this state, the control unit 9 performs switching control on the three-way valve 77 to fully open the branch path 721. As a result, the air to circulate through the second bypass line 78 can be supplied to the collector 73 as gas for purge at substantially the same flow rate, and thus the vaporized fuel collected by the collector 73 can be discharged from the discharge port 737. By performing control in this way, the vaporized fuel can be discharged at an arbitrary time when air is being supplied to the collection mechanism 7. Moreover, because there is no change in the pressure loss of the collection mechanism 7 before and after the discharge of vaporized fuel, the pulsation of the flow rate of air can be suppressed and thus a vibration and the deterioration of the device caused by this pulsation can be suppressed.

Similarly to the third embodiment, the present embodiment can suppress the time-direction unevenness of the discharge amount of vaporized fuel. In other words, when supplying the gas for purge to the collector 73, the present embodiment initially sets the opening degree of the three-way valve 77 related to the branch path 721 to a small value and the opening degree of the three-way valve 77 related to the second bypass line 78 to a large value to lower the supplied amount of gas for purge to be introduced into the collector 73. Then, the present embodiment controls the opening degrees of the three-way valve 77, in such a manner that the opening degree related to the branch path 721 is larger than the opening degree related to the second bypass line 78 with the passage of time, to increase the supplied amount of gas for purge to be introduced into the collector 73. Finally, the present embodiment only needs to perform control on the three-way valve 77 to fully open the branch path 721 and fully close the second bypass line 78. In FIG. 6, the valve 76 is not attached, but the present embodiment may attach the valve 76 to the collector 73 similarly to the third embodiment to perform interlocking control of the three-way valve 77 and the valve 76. Moreover, the first bypass line 75 may be omitted in FIG. 6.

Fifth Embodiment

Figure 7:
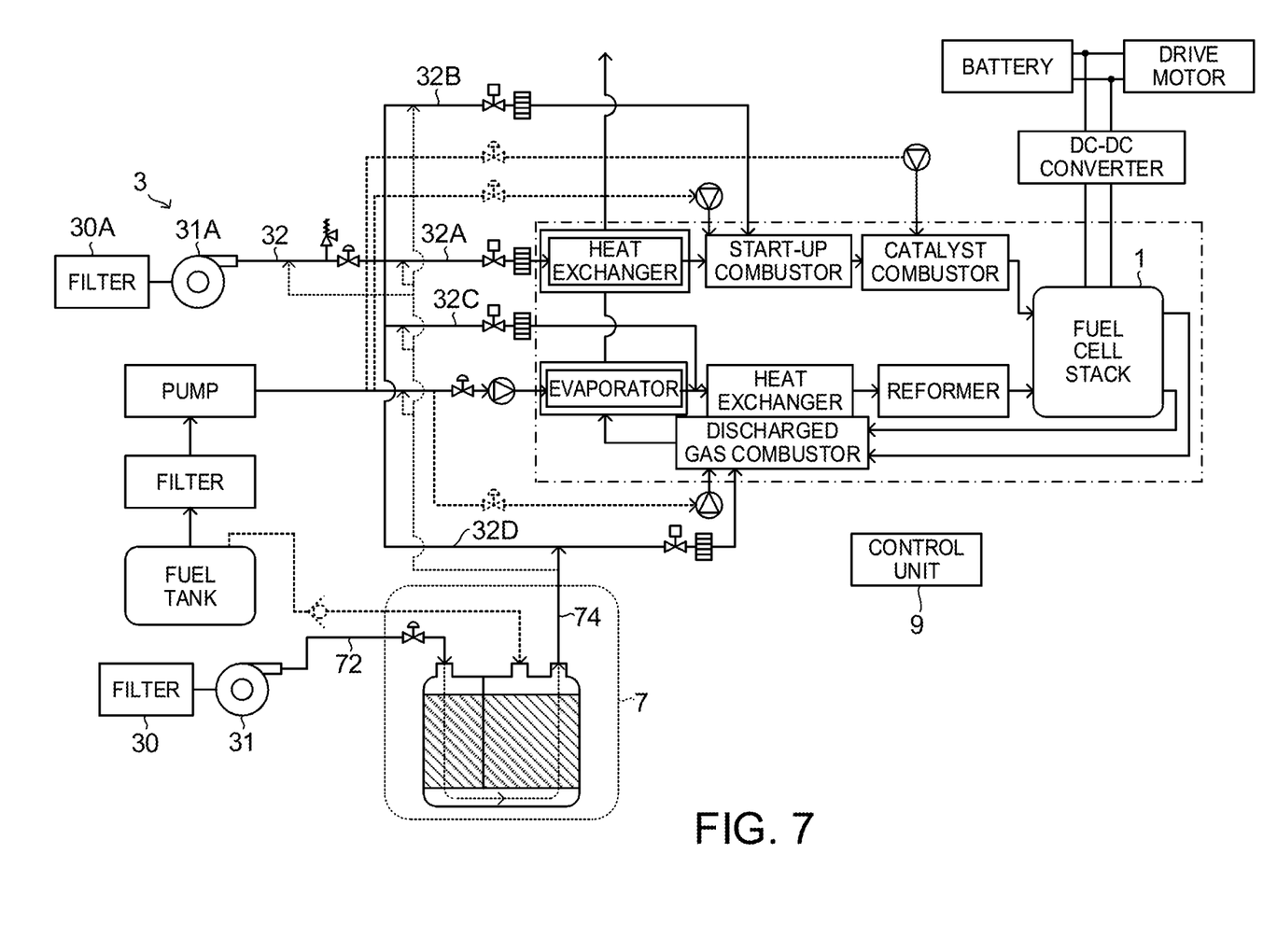
FIG. 7 is a block diagram illustrating the main configuration of a fuel cell system according to a fifth embodiment.

FIG. 7 is a block diagram illustrating the main configuration of a fuel cell system according to the fifth embodiment. The basic configuration of the fuel cell system according to the fifth embodiment is common to the first embodiment, but a purge gas supply source (the compressor 31) and the filter 30 that constitute the collection mechanism 7 are separated from the cathode gas supply system 3. On the other hand, the cathode gas supply system 3 includes a compressor 31A and a filter 30A that are dedicated thereto. The compressor 31A is controlled in a similar manner to the compressor 31 that is used in the first to fourth embodiments.

Moreover, the supply path 72 and the discharge path 74 that constitutes the collection mechanism 7 are separated from the path 32 of the cathode gas supply system 3 and the paths 32A to 32D that branch from the path 32. FIG. 7 illustrates the state where the discharge path 74 is connected to the path 32D with a solid line. However, as indicated by a dashed line of FIG. 7, the discharge path 74 can be connected to any of the path 32, the path 32A, the path 32B, the path 32C, and the path 32D. Herein, when air circulates through the path connected to the discharge path 74, the control unit 9 can drive the compressor 31 to discharge the vaporized fuel collected by the collection mechanism 7 to the connected path.

As described above, by separating a supply source configured to supply air (cathode gas) to the fuel cell stack 1 and a supply source configured to supply gas for purge to the collection mechanism 7, the burden of each supply source can be reduced.

As described above, the embodiments of the present invention have been explained, but the above embodiments are only a part of the application example of the present invention and the technical scope of the present invention is not intended to be limited to the specific configurations of the above embodiments.

The invention claimed is:

1. A fuel cell system comprising:
   a fuel cell that is supplied with a fuel gas and an oxidant gas to generate electric power;
   a fuel tank that stores therein liquid fuel acting as the fuel gas;
   an oxidant gas supply source configured to supply the oxidant gas;
   a supply/discharge mechanism that is connected to the fuel tank and the oxidant gas supply source, the supply/discharge mechanism being configured to supply and discharge the fuel gas and the oxidant gas to and from the fuel cell, wherein the supply/discharge mechanism comprises:
   a fuel gas supply system connected to the fuel tank and configured to supply the fuel gas to an anode of the fuel cell,
   an oxidant gas supply system connected to the oxidant gas supply source and configured to supply the oxidant gas to a cathode of the fuel cell, and
   a system discharge system configured to discharge a fuel off-gas and an oxidant off-gas discharged from the fuel cell;
   a collector configured to collect vaporized fuel that is vaporized in the fuel tank;
   an introduction path that is connected to the fuel tank and the collector, the introduction path configured to guide the vaporized fuel accumulated in the fuel tank to the collector;
   a discharge path configured to discharge the vaporized fuel collected by the collector to the supply/discharge mechanism;
   a supply path and a purge gas supply unit that are connected to the collector, the supply path and the purge gas supply unit being configured to supply, to the collector, a purge gas for pushing out the vaporized fuel collected by the collector into the discharge path;
   wherein the purge gas supply unit also serves as the oxidant gas supply source;
   wherein the supply path is connected to the oxidant gas supply system; and
   wherein the discharge path is connected to the system discharge system.

2. The fuel cell system according to claim 1, further comprising:
   a first bypass line that is connected to the introduction path and the discharge path to bypass the collector.

3. The fuel cell system according to claim 2, wherein the first bypass line is configured so that a flow rate of the purge gas is more than that of the collector.

4. The fuel cell system according to claim 2, wherein the collector includes a valve that is provided on at least one of an introduction side of the purge gas or a discharge side of the vaporized fuel, the valve controlling a flow rate of the purge gas to be supplied to the collector.

5. The fuel cell system according to claim 1, further comprising:
a second bypass line that is connected to the introduction path and the discharge path to bypass the collector; and
a changeover valve that switches between the second bypass line and the collector to select a circulation path of the purge gas, wherein
flow rates of the purge gas in the collector and the second bypass line are substantially same.

6. The fuel cell system according to claim 1, wherein
the supply/discharge mechanism includes a discharged gas combustor that is placed at a downstream-side position from the fuel cell, and
the discharge path is configured to supply the vaporized fuel to the discharged gas combustor.

7. The fuel cell system according to claim 1, wherein
the supply/discharge mechanism includes a start-up combustor that is placed at a position between the oxidant gas supply source and the fuel cell, the start-up combustor mixing fuel for combustion with the oxidant gas and igniting a mixture to generate combustion gas and supply the combustion gas to the fuel cell, and
the discharge path is configured to discharge the vaporized fuel to the start-up combustor.

8. The fuel cell system according to claim 1, wherein
the supply/discharge mechanism includes:
a heat exchanger that is placed at a position between the oxidant gas supply source and the fuel cell, the heat exchanger heating the oxidant gas by using discharged gas discharged from the fuel cell; and
a catalyst combustor that is placed at a position between the heat exchanger and the fuel cell, the catalyst combustor mixing fuel for combustion with the oxidant gas to generate combustion gas and supply the combustion gas to the fuel cell, and
the discharge path is configured to discharge the vaporized fuel to the heat exchanger.

9. The fuel cell system according to claim 1, wherein
the supply/discharge mechanism includes a reformer that is placed at a position between the fuel tank and the fuel cell, the reformer reforming the liquid fuel to the fuel gas, and
the discharge path is configured to discharge the vaporized fuel to the reformer.

10. The fuel cell system according to claim 9, wherein
the supply/discharge mechanism includes:
a discharged gas combustor that is placed at a downstream-side position from the fuel cell; and
a heat exchanger that is placed at a position between the fuel tank and the reformer, the heat exchanger heating the liquid fuel by using heat from combustion of discharged gas performed by the discharged gas combustor, and
the discharge path supplies the vaporized fuel upstream of the heat exchanger.

11. The fuel cell system according to claim 1, wherein
the supply/discharge mechanism includes:
a discharged gas combustor that is placed at a downstream-side position from the fuel cell;
a reformer that is placed at a position between the fuel tank and the fuel cell, the reformer reforming the liquid fuel to the fuel gas;
a heat exchanger that is placed at a position between the oxidant gas supply source and the fuel cell, the heat exchanger heating the oxidant gas by using discharged gas discharged from the fuel cell; and
a start-up combustor that is placed at a position between the heat exchanger and the fuel cell, the start-up combustor mixing fuel for combustion with the oxidant gas heated by the heat exchanger to generate combustion gas and supply the combustion gas to the fuel cell, and
the discharge path is configured to discharge the vaporized fuel to at least two of the reformer, the heat exchanger, the start-up combustor, and the discharged gas combustor.

12. The fuel cell system according to claim 1, wherein
the supply/discharge mechanism includes a discharged gas combustor that is placed at a downstream-side position from the fuel cell,
the fuel cell and the discharged gas combustor are accommodated in a heat-insulating case,
the collector is placed outside of the heat-insulating case, and
the discharge path penetrates through the heat-insulating case.

13. The fuel cell system according to claim 1, wherein
the supply/discharge mechanism includes:
a discharged gas combustor that is placed at a downstream-side position from the fuel cell;
a fuel reforming system that is placed at a position between the fuel tank and the fuel cell, the fuel reforming system being configured to heat the liquid fuel and reform the liquid fuel to the fuel gas;
a heat exchanger that is placed at a position between the oxidant gas supply source and the fuel cell, the heat exchanger heating the oxidant gas; and
a start-up combustion system that is placed at a position between the heat exchanger and the fuel cell, the start-up combustion system being configured to mix fuel for combustion with the oxidant gas heated by the heat exchanger to generate combustion gas and supply the combustion gas to the fuel cell,
the fuel cell, the fuel reforming system, the heat exchanger, the start-up combustion system, and the discharged gas combustor are accommodated in a heat-insulating case,
the collector is placed outside of the heat-insulating case, and
the discharge path penetrates through the heat-insulating case.

* * * * *